United States Patent
Arambepola et al.

(10) Patent No.: US 8,938,015 B2
(45) Date of Patent: Jan. 20, 2015

(54) ORTHOGONAL FREQUENCY DIVISION MULTIPLEX (OFDM) DEMODULATOR WITH IMPROVED CYCLIC AMBIGUITY RESOLUTION

(75) Inventors: Bernard Arambepola, Bedfordshire (GB); Thushara Hewavithana, Hertfordshire (GB)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/997,706

(22) PCT Filed: Mar. 15, 2012

(86) PCT No.: PCT/US2012/029297
§ 371 (c)(1),
(2), (4) Date: Oct. 22, 2013

(87) PCT Pub. No.: WO2013/137891
PCT Pub. Date: Sep. 19, 2013

(65) Prior Publication Data
US 2014/0219324 A1   Aug. 7, 2014

(51) Int. Cl.
*H04L 27/22* (2006.01)
*H04L 27/01* (2006.01)
(Continued)

(52) U.S. Cl.
CPC ............... *H04L 27/22* (2013.01); *H04L 27/26* (2013.01); *H04B 17/0042* (2013.01); *H04L 27/01* (2013.01)
USPC .......................................... 375/260; 375/340

(58) Field of Classification Search
CPC ..... H04L 27/22; H04L 27/01; H04L 25/0212; H04L 25/022; H04L 25/0232; H04L 27/2647; H04L 27/2675; H04L 27/2665; H04B 17/0042
USPC ................... 375/343, 340, 316, 260
See application file for complete search history.

(56) References Cited

U.S. PATENT DOCUMENTS

2004/0218520 A1*  11/2004  Aizawa ......................... 370/203
2006/0222099 A1*  10/2006  Varadarajan et al. ......... 375/260

(Continued)

OTHER PUBLICATIONS

International Search Report and Written Opinion received for PCT application No. PCT/US2012/029297, mailed on Nov. 28, 2012, 9 Pages.

(Continued)

*Primary Examiner* — Aristocratis Fotakis
(74) *Attorney, Agent, or Firm* — Grossman, Tucker, Perreault & Pfleger, PLLC

(57) ABSTRACT

A system according to one embodiment includes a demodulator configured to receive an OFDM modulated signal over a channel, the signal including a sequence of symbols, each of the symbols including one or more pilot carriers and one or more data carriers; a time filtering and interpolation circuit coupled to the demodulator, the time filtering and interpolation circuit configured to estimate the frequency response of the channel based on time filtering and interpolation of the pilot carriers; a phase slope correction circuit configured to apply each of a plurality of phase slope corrections to the frequency response and to the data carriers; a frequency filtering and interpolation circuit configured to calculate frequency response estimates of the channel at data carrier frequencies based on frequency filtering and interpolation of the phase slope corrected frequency response; an equalization circuit configured to equalize the phase slope corrected data carriers based on the calculated frequency response estimates; an error calculation circuit configure to calculate the mean square error between the equalized data carriers and a nearest QAM constellation point; and an iterative phase slope optimization circuit configured to select the phase slope correction associated with the minimum of the mean square errors, wherein the selected phase slope resolves the cyclic ambiguity.

33 Claims, 7 Drawing Sheets

(51) Int. Cl.
  *H04B 17/00*  (2006.01)
  *H04L 27/26*  (2006.01)

(56) References Cited

U.S. PATENT DOCUMENTS

| 2010/0074348 | A1* | 3/2010 | Xu ................................ 375/260 |
| 2010/0177251 | A1 | 7/2010 | Kimura et al. |
| 2011/0158334 | A1 | 6/2011 | Arambepola et al. |
| 2011/0242428 | A1 | 10/2011 | Blouin et al. |
| 2011/0310945 | A1* | 12/2011 | Sato ............................... 375/224 |
| 2011/0317790 | A1* | 12/2011 | Yokokawa et al. ............ 375/329 |
| 2012/0051471 | A1* | 3/2012 | Hewavithana et al. ....... 375/343 |

OTHER PUBLICATIONS

International Preliminary Report on Patentability and Written Opinion received for PCT Patent Application No. PCT/US2012/029297, mailed on Sep. 25, 2014, 6 pages.

* cited by examiner

ORTHOGONAL FREQUENCY DIVISION MULTIPLEX (OFDM) DEMODULATOR WITH IMPROVED CYCLIC AMBIGUITY RESOLUTION

FIELD

The present disclosure relates to Orthogonal Frequency Division Multiplex (OFDM) demodulators, and more particularly, to OFDM demodulators with improved channel estimation and symbol timing recovery through cyclic ambiguity resolution.

BACKGROUND

Orthogonal Frequency Division Multiplex (OFDM) modulation techniques are often used to transmit signals in a network, such as, for example, cable networks, wireless networks or digital television broadcasts. These may including wireless personal area networks (WPAN), wireless local area networks (WLAN), Wireless Metropolitan Area Networks (WMAN), Wireless Wide Area Networks (WWAN), Digital Video Broadcasting (DVB-T2) and the like. To improve spectrum usage efficiency, these OFDM-based communication systems are increasingly being implemented as Single Frequency Networks (SFNs), where the same frequency is used by multiple transmitters to broadcast the same information over a large region. This can result in the reception of replicas of the signal at the receiver, where the replicas appear as echoes with relatively large time differences. These large time differences typically exceed the cyclic-prefix guard interval that is normally used to mitigate signal corruption associated with echo.

These SFN generated echoes create a cyclic ambiguity in the channel impulse response which adversely affects channel equalization and symbol timing recovery and thus degrades the OFDM receiver performance. Existing solutions to this problem rely on the use of continuous pilot carriers that occupy the same carrier location in every received OFDM symbol. There is an increasing trend, however, to reduce the number of continuous pilot carriers or, in some cases, eliminate them entirely since they use up spectrum that could be occupied by data carriers. Existing solutions relying on continuous pilot carriers would thus be rendered increasingly ineffective.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
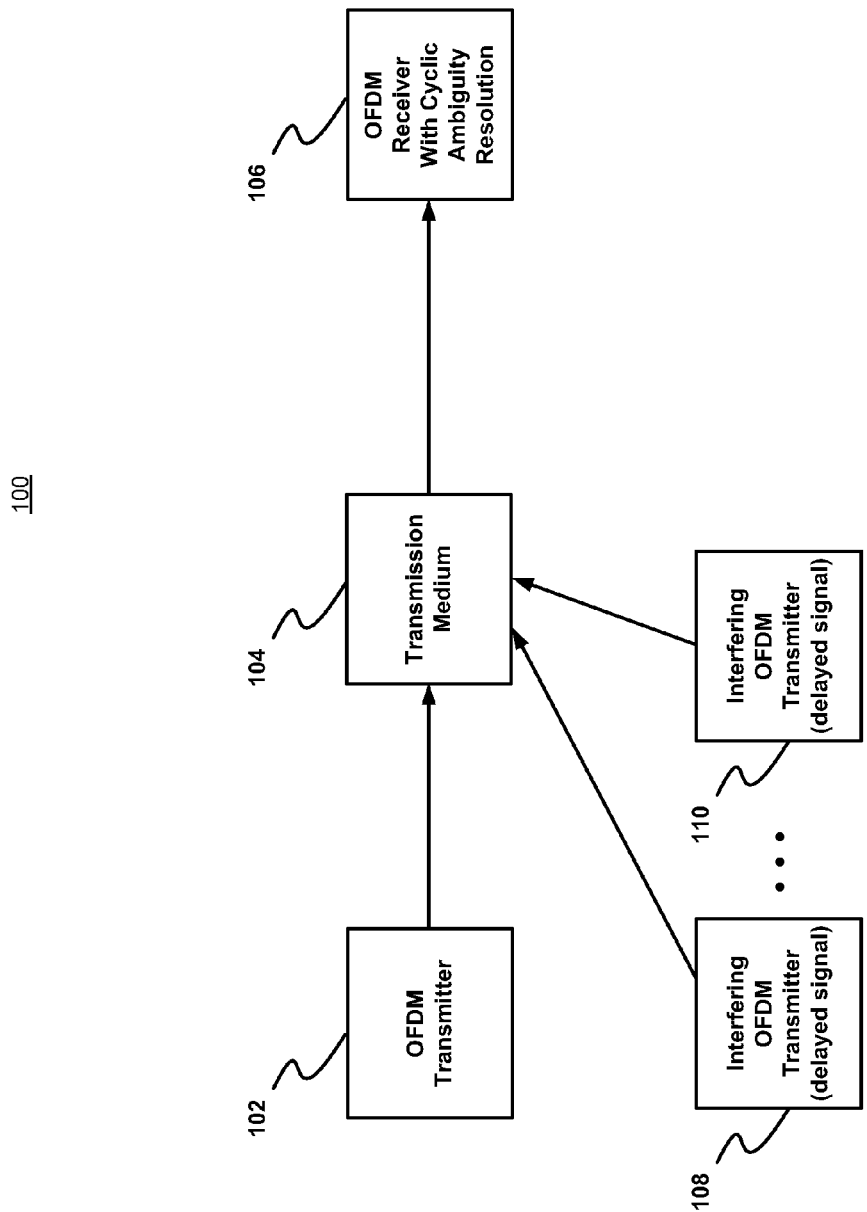
FIG. 1 illustrates a top level system diagram of one exemplary embodiment consistent with the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure provides systems and methods for cyclic ambiguity resolution in a receiver performing OFDM demodulation. The disclosure relates to improved channel frequency response estimation for receivers operating in transmission environments that introduce cyclic ambiguity such as, for example, single frequency networks. This may be accomplished by estimating new channel impulse responses corresponding to a range of cyclically rotated versions of an initially estimated channel impulse response and selecting the version that results in the lowest mean squared error between data carriers equalized in accordance with that cyclically rotated version and the nearest Quadrature Amplitude Modulated (QAM) constellation points. The cyclic rotation may be performed in the frequency domain as a linear phase shift, resulting in increased efficiency.

Some embodiments may be used in conjunction with one or more types of digital television broadcasting networks, systems and standards, for example, Digital Video Broadcasting Second Generation Terrestrial (DVB-T2), Integrated Services Digital Broadcasting Terrestrial (ISDB-T) or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, Wireless Metropolitan Area Networks (WMAN), Wireless Wide Area Networks (WWAN), ZigBee™, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

Some embodiments may be used in conjunction with suitable limited-range or short-range wireless communication networks, for example, "piconets", e.g., a wireless area network, a WVAN, a WPAN, and the like.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a smartphone, a digital television, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a wired or wireless network, a wireless area network, a Wireless Video Are Network (WVAN), a Local Area Network (LAN), a WLAN, a PAN, a WPAN, devices and/or networks operating in accordance with existing Wireless HDTM and/or Wireless-Gigabit-Alliance (WGA) specifications and/or future versions and/or derivatives thereof, devices and/or networks operating in accordance with existing IEEE 802.11 (IEEE 802.11-2007: Wireless LAN Medium Access Control (MAC) and Physical Layer (PHY) Specifications) standards and amendments ("the IEEE 802.11 standards"), IEEE 802.16 standards for Worldwide Interoperability for Microwave Access (WiMAX), Third Generation Partnership Project (3GPP) including Long Term Evolution (LTE) and Long Term Evolution Advanced (LTE-A) and/or future versions and/or derivatives thereof, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral device that is integrated with a computer, or a peripheral device that is attached to a computer. In some embodiments, the term "wireless device" may optionally include a wireless service.

It should be understood that the present invention may be used in a variety of applications. Although the present invention is not limited in this respect, the circuits and techniques disclosed herein may be used in many apparatuses such as stations of a radio system or nodes on a cable network. Stations intended to be included within the scope of the present invention include, by way of example only, WLAN stations, wireless personal network (WPAN), and the like.

FIG. 1 illustrates a top-level system diagram 100 of one exemplary embodiment consistent with the present disclosure. A signal may be sent from an OFDM modulating transmitter 102 over a transmission medium 104, which may be a wireless network or a digital video broadcast, for example, and received at receiver 106 where OFDM demodulation is performed with cyclic ambiguity resolution according to an embodiment of the present disclosure. Any number of other OFDM modulating transmitters 108, 110 may be transmitting the same signal as transmitter 102 at the same frequency and over the same transmission medium 104 but from greater distances. This may result in interfering versions of the signal being received at receiver 106 in a delayed and attenuated form in the same manner as an echo. The received signal thus has a cyclic ambiguity which, if resolved, may improve receiver performance.

Figure 2:
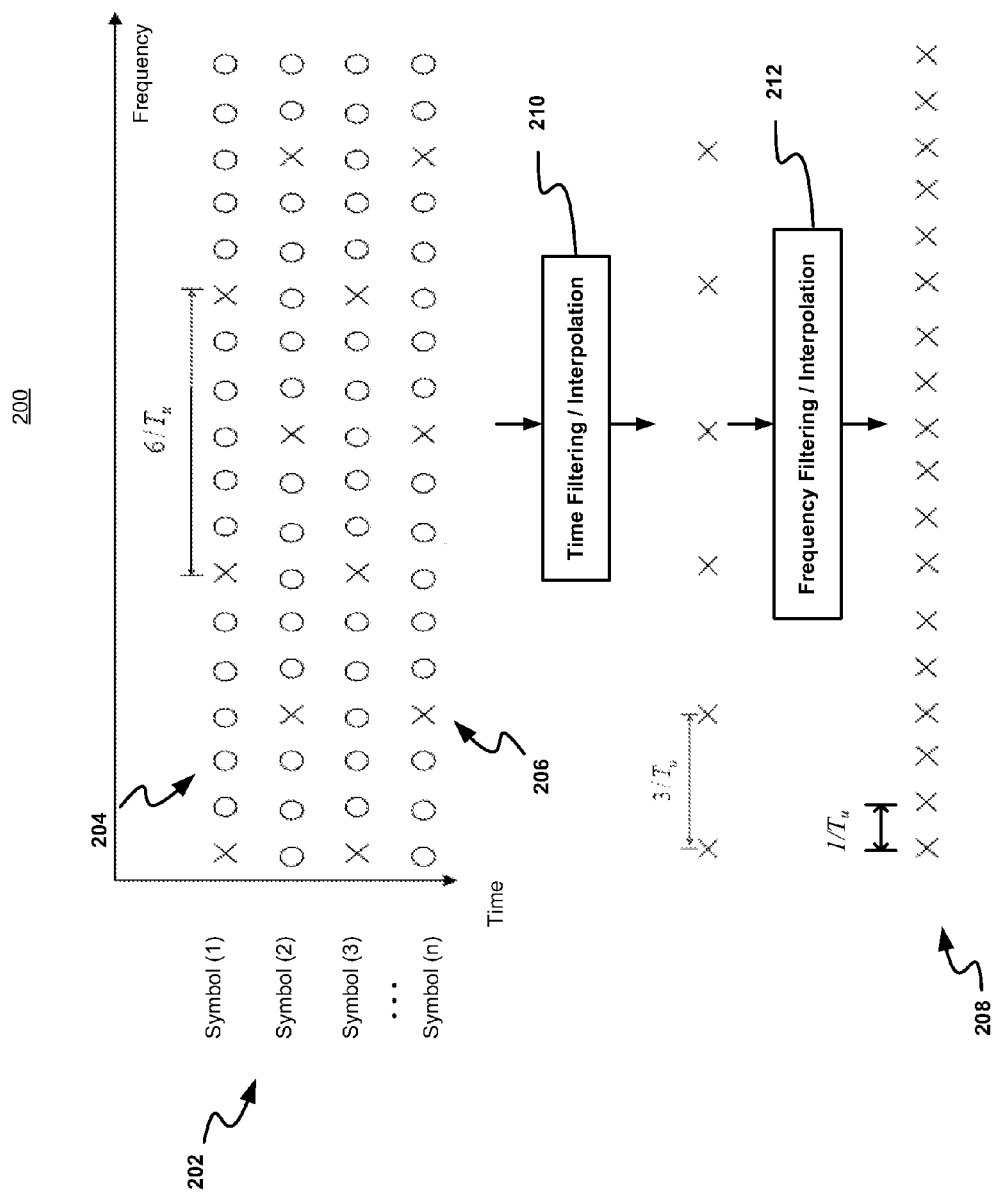
FIG. 2 illustrates example OFDM signals and associated processing consistent with an exemplary embodiment of the present disclosure.

FIG. 2 illustrates example OFDM signals and associated processing 200 consistent with an exemplary embodiment of the present disclosure. An OFDM modulated signal comprises a series of symbols 202 ordered sequentially over time. Each symbol comprises a number of carriers distributed over a frequency range. If the time duration of the symbol is $T_u$, then the frequency spacing between carriers is $1/T_u$. The carriers may be data carriers 204 as indicated by a circle or pilot carriers 206 as indicated by a cross. While data carriers typically convey data, pilot carriers generally have a known, or pre-determined, modulation that may be used for timing synchronization recovery and channel frequency response estimation. The data carriers may be QAM modulated and take on values associated with constellation points. For example, in QAM-1024 modulation there are 1024 possible constellation points.

Pilot carriers used for channel estimation are commonly referred to as scattered pilots. Their known modulation enables the receiver to estimate the channel frequency response at the scattered pilot frequencies. Scattered pilots have a regular structure within the OFDM symbol but do not occupy the same carrier location in every symbol. In the example signal illustrated in FIG. 2, the scattered pilots in each symbol are spaced apart by 6 carriers (or $6/T_u$ in frequency) but are staggered by 3 carriers (or $3/T_u$ in frequency) between symbols. Time filtering/Interpolation 210, from one symbol to the next over time, enables the receiver to estimate the channel frequency response at frequency spacing of $3/T_u$. Frequency filtering/Interpolation 212, from one carrier to the next over frequency, enables the receiver to estimate the channel frequency response at frequency spacing of $1/T_u$ which includes the data carrier locations.

Figure 3:
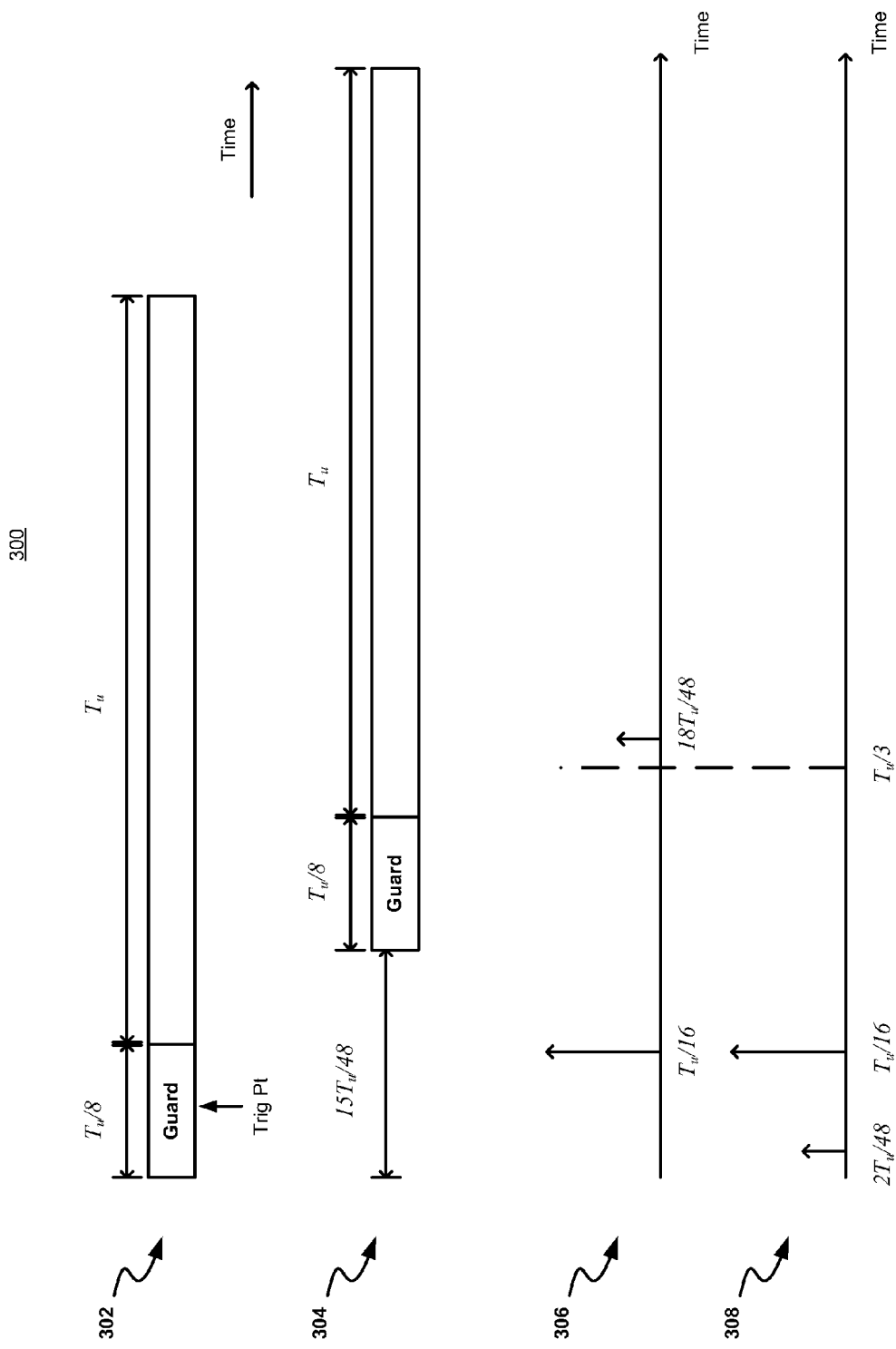
FIG. 3 illustrates an example signal with cyclic ambiguity for processing by an exemplary embodiment consistent with the present disclosure.

FIG. 3 illustrates an example signal with cyclic ambiguity 300 for processing by an exemplary embodiment consistent with the present disclosure. A received symbol of duration $T_u$ with a cyclic prefix guard interval of duration $T_u/8$ is shown at 302. Cyclic prefix guard intervals typically range from $T_u/32$ to $T_u/8$ although other lengths are possible. The cyclic prefix guard interval is used in an auto-correlation process to estimate an initial Fast Fourier Transform (FFT) trigger point. A delayed and attenuated signal 304 is also received from a more distant transmitter 108, 110 in a single frequency network. The delay, for this example, is $15T_u/48$, which is slightly less than $T_u/3$. Given the estimated channel frequency response spacing of $3/T_u$ from the example described in the discussion of FIG. 2, it is theoretically possible to estimate an unambiguous channel frequency response provided the echoes (whether pre-echoes or post-echoes) are contained within a time interval $T_u/3$ as is the case in this example.

The delayed signal 304 may still present a problem, however, for the following reason. The cyclic-prefix autocorrelation will respond to the stronger signal component 302 and generate an FFT trigger point at approximately the midpoint of the guard interval of the stronger signal component. This will result in an estimated impulse response 306 where the main impulse from signal 302 is at time $T_u/16$ (the mid-point of the guard interval) and the weaker impulse from signal 304 is at time $18T_u/48$ (the delay of the weaker signal $15T_u/48$ plus the guard interval midpoint offset $T_u/16$). The channel frequency response estimates, however, are available at frequencies $3/T_u$ apart which implies that the impulse response corresponding to this frequency response is periodic with period $T_u/3$. Therefore, the actual impulse response 308 corresponding to this frequency response has the weak echo at $18T_u/48$, which is greater than $T_u/3$, aliased or cyclically rotated back to $2T_u/48$ (the difference between $18T_u/48$ and $T_u/3$). This results in an incorrect channel frequency response. This problem can be corrected, however, by estimating new channel frequency responses corresponding to a range of cyclically rotated versions of the impulse response, as will be described in greater detail below.

Figure 4:
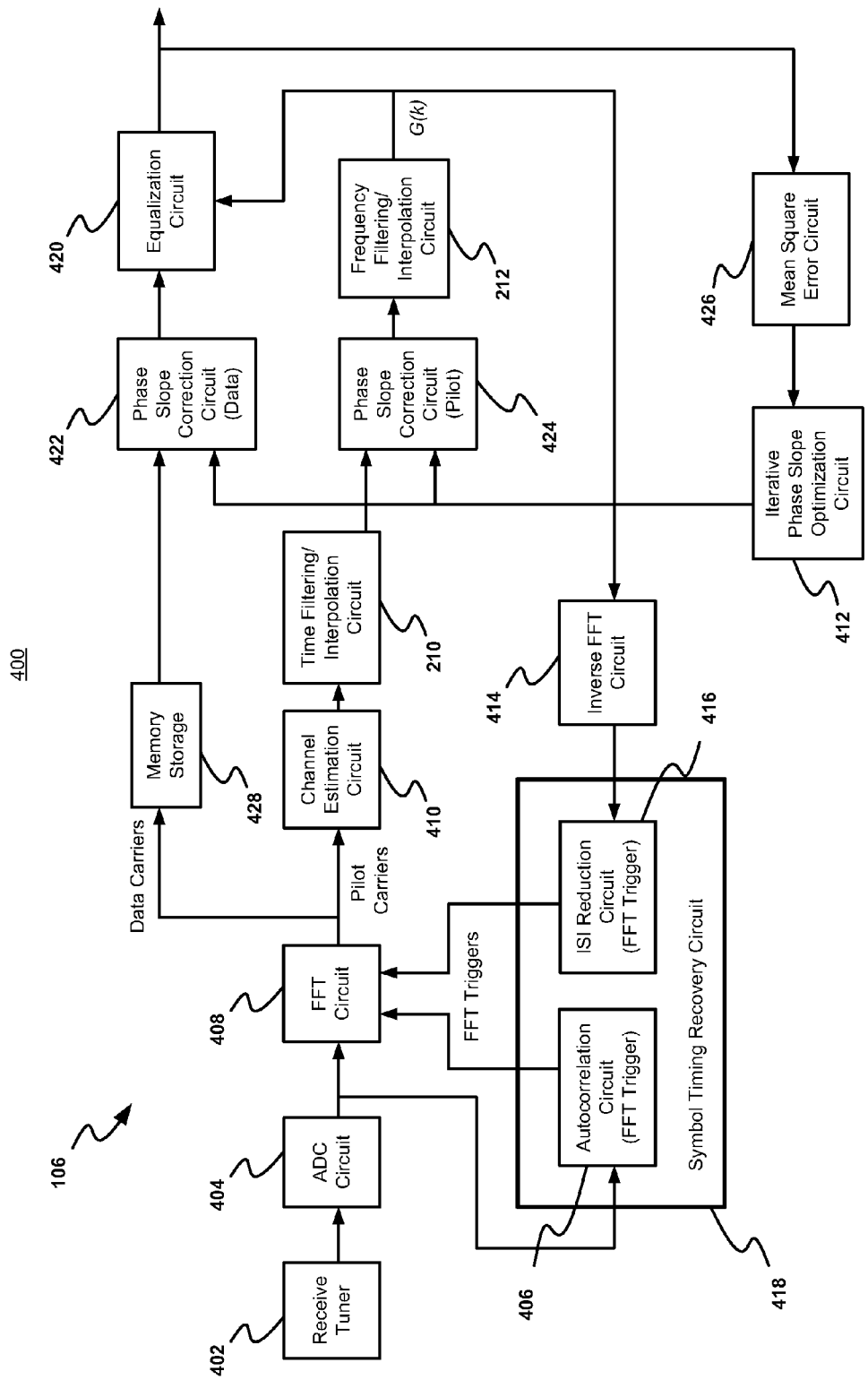
FIG. 4 illustrates a more detailed system block diagram of one exemplary embodiment consistent with the present disclosure.

FIG. 4 illustrates a more detailed system block diagram 400 of one exemplary embodiment consistent with the present disclosure. Components of the OFDM receiver 106 are shown staring with a receive tuner 402 which is tuned to a center frequency of the received OFDM signal. Receive tuner 402 may down convert and low pass or band pass filter the OFDM signal to a base band frequency range. The output of receive tuner 402 is coupled to an analog to digital converter (ADC) circuit 404. The output of the ADC circuit 404 may then be processed by digital filtering (not shown), to eliminate unwanted channels, and further processed by clock recovery and frequency recovery stages (not shown), to correct for sampling rate differences and frequency offsets between transmitter and receiver.

These processed digital samples may then be provided to the symbol timing recovery circuit 418 which estimates an initial FFT trigger point by finding a peak corresponding to the auto-correlation of the cyclic-prefix guard interval using autocorrelation circuit 406. FFT circuit 408 uses this initial trigger point to convert the signal to the frequency domain. Channel estimation circuit 410 performs an initial estimation of the channel frequency response based on available pilot carrier frequencies. The iterative phase slope optimization circuit 412, in combination with other circuit elements as will be described in greater detail below, estimates new channel frequency responses corresponding to a range of linearly phase shifted versions of the frequency response (equivalent to cyclically rotated versions of the impulse response), and selects the version that results in the smallest error calculated by mean square error circuit 426. The term "optimum" phase slope, as used herein, is the phase slope corresponding to that selected version of the frequency response.

The inverse FFT (IFFT) circuit 414 transforms the selected version of the channel frequency response to an impulse response in the time domain for further processing by the symbol timing recovery circuit 418. The symbol timing recovery circuit 418 uses this impulse response to obtain an improved position in time to trigger the FFT in order to reduce inter-symbol interference (ISI) using ISI reduction circuit 416.

The data carriers, which may be stored in memory storage 428, are phase shifted by phase slope correction circuit 422, and then equalized in the frequency domain by equalization circuit 420 using the selected frequency response from the frequency/filtering interpolation circuit 412.

The iterative phase slope optimization circuit 412, in combination with other circuit elements, as will be described below, resolves cyclic ambiguity caused by, for example, reception of delayed and attenuated versions (or echoes) of the signal as described above. This may be accomplished by estimating new channel frequency responses corresponding to a range of linearly phase shifted versions of the frequency response. Phase shifting in the frequency domain corresponds to time shifting in the time domain, as for example:

$$h(t) \leftrightarrow H(f)$$

$$h(t-\tau) \leftrightarrow H(f)\exp(-j2\pi f\tau)$$

where a time shift of $\tau$ corresponds to a phase shift of $\exp(-j2\pi f\tau)$. The range of phase shifts corresponds to a range of time shifts that correspond to a range of anticipated echo delays. For each time shift $\tau$, a linear phase correction may be applied to the channel frequency response $H(k)$ through multiplication by $\exp(-j2\pi kM\tau/T_u)$ to implement the impulse response rotation of $\tau$. The factor M is present to account for the fact that $H(k)$ is available at frequency spacing of $M/T_u$. In the examples discussed previously, M was equal to 3 for a frequency spacing of $3/T_u$. For each of these phase shift iterations, a frequency filtering operation is then performed to obtain the channel frequency response $G(k)$ at the data carrier locations spaced at $1/T_u$ in frequency. The linear phase slope correction is then applied to the data carriers through multiplication by $\exp(-j2\pi k\tau/T_u)$ to compensate for the slope applied to the channel frequency response. The M factor is omitted in this phase shift, i.e., M=1, because the data carriers are spaced by $1/T_u$. The data carriers in this symbol are then equalized using the channel frequency response $G(k)$ calculated above.

Referring again to FIG. 4, the pilot carriers and data carriers are separated at the output of FFT circuit 408. The channel frequency response estimation is performed on the pilots at channel estimation circuit 410 and time filtering/interpolation circuit 210 interpolates the pilots over multiple symbols. Phase slope correction circuit 424 then introduces the cyclic time shift to the impulse response and frequency filtering/interpolation circuit 212 computes the channel frequency response $G(k)$. The data carriers, which are stored in storage memory 428 so that they can be re-used as often as needed, are also phase slope corrected, by phase slope correction circuit 422, and then equalized by equalization circuit 420 using channel frequency response $G(k)$.

The mean square error between the equalized data carriers and the nearest QAM constellation points is then calculated, by mean square error circuit 426, and compared to the mean square error for the other phase shift values. The phase shift that results in the lowest mean square error is selected, by iterative phase slope optimization circuit 412, as the optimum phase shift that provides the cyclic ambiguity resolution. This phase shift is re-used in the process of equalization as mentioned above. Additionally, the inverse FFT of this phase rotated frequency response is computed to provide the unambiguous (non-rotated) channel impulse response, which is then used to obtain the improved trigger position for the FFT through a process of reducing inter-symbol interference.

The iterative phase slope optimization circuit 412 does not need to operate continuously. Once the phase slope correction has been determined, it may typically remain valid for an extended time period since the echo profile is not expected to change rapidly. In the case of static transmitter and receiver locations, it may be sufficient to calculate the phase slope correction once during acquisition. With mobile transmitters and/or receivers the echo profile may be time varying, but since symbol durations are relatively short (on the order of 1 millisecond) it may be possible to use the same phase slope correction over several symbols. Additionally, after the initial broad search range (full cycle) phase slope search, subsequent searches may be narrowed to the vicinity of the previously calculated phase slope correction to further reduce the computational burden. In some embodiments, the iterative phase slope optimization may be performed as a background task in software.

In some embodiments, the phase slope optimization may be performed over several symbols without saving the data between symbols. In other words, a different phase slope may be tried on each symbol until the full range of phase slopes have been used, at which point the optimum phase slope will be determined.

In some embodiments, the mean square error may be computed over only a subset of the data carriers in an OFDM symbol, to eliminate any carriers that are known to be corrupted as a result of other sources of interference.

Figure 5:
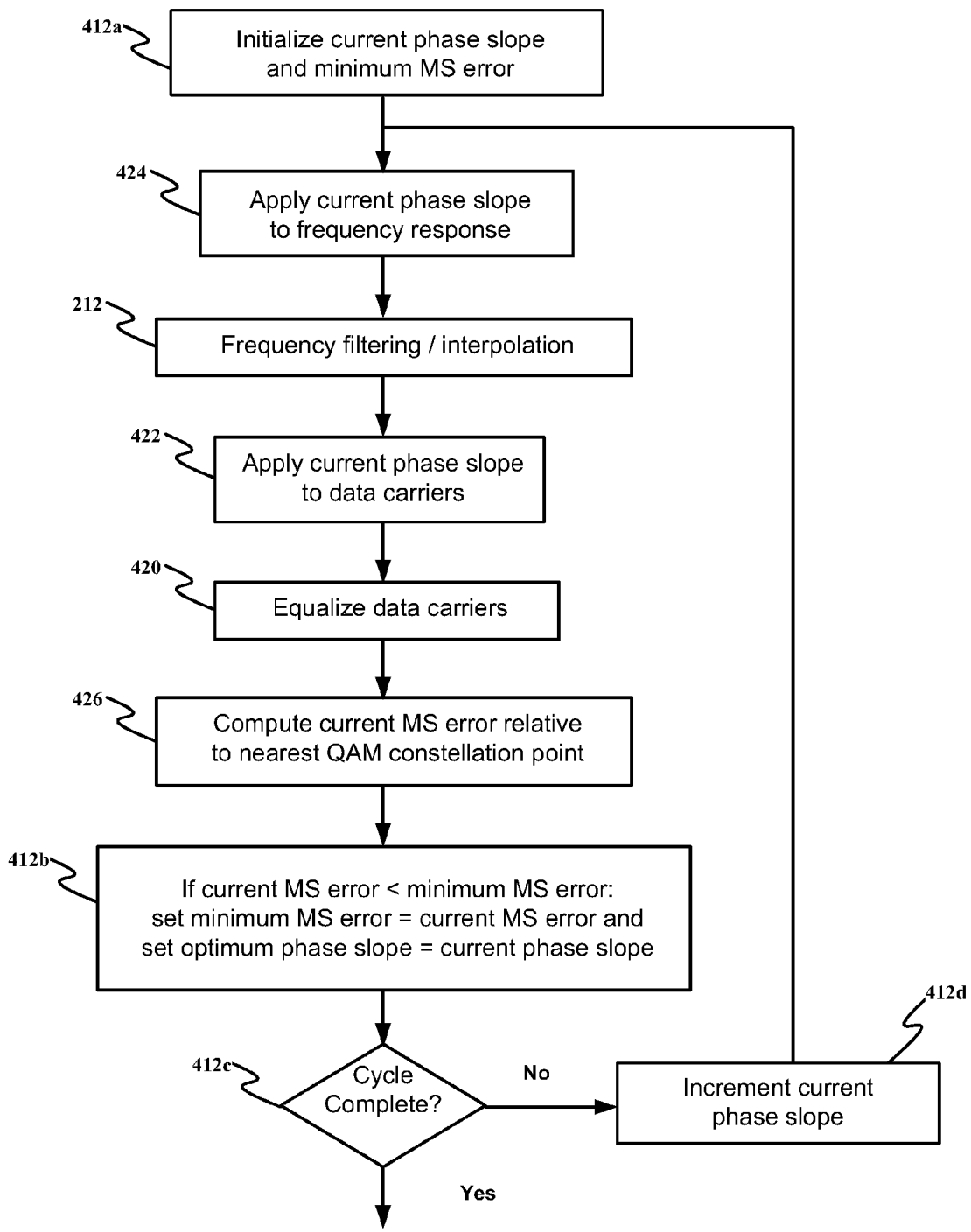
FIG. 5 illustrates a flowchart of operations of one exemplary embodiment consistent with the present disclosure.

FIG. 5 illustrates a flowchart of operations 500 of one exemplary embodiment consistent with the present disclosure. The flowchart illustrates how operations performed by the iterative phase slope optimization circuit 412 relate to other system components as presented in FIG. 4. At operation 412a, a current phase slope and a minimum mean square (MS) error are initialized. The current phase slope may be set to the first value in a range of phase slope values to be evaluated. The minimum MS error maybe set to a value that is greater than any expected MS error. At operation 424, the current phase slope is applied to the frequency response. At operation 212, a frequency filtering/interpolation is performed. At operation 422, the current phase slope is applied to the data carriers. At operation 420, the data carriers are equalized. At operation 426, the current MS error for the data carriers relative to a nearest QAM constellation point is computed. At operation 412b, if the current MS error is less than the minimum MS error, the minimum MS error is set to the current MS error and the optimum phase slope is set to the current phase slope. At operation 412c, if the cycle is not complete, the current phase slope is incremented at operation 412d, and the iteration is repeated at operation 424 with the incremented current phase slope. If the cycle is complete, the optimum phase slope corresponding to the minimum mean square error has been identified.

Figure 6:
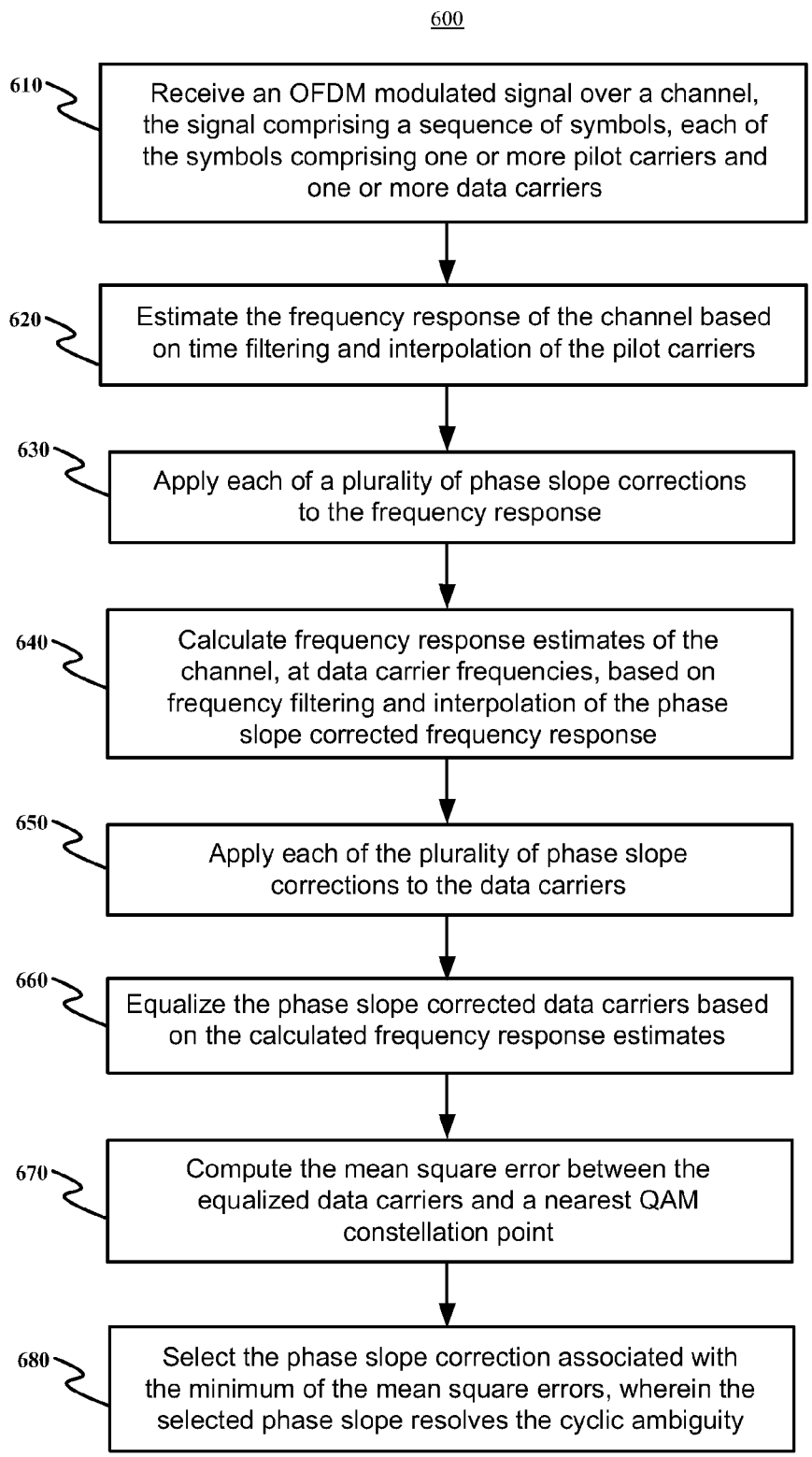
FIG. 6 illustrates a flowchart of operations of another exemplary embodiment consistent with the present disclosure.

FIG. 6 illustrates a flowchart of operations 600 of another exemplary embodiment consistent with the present disclosure. At operation 610, an OFDM modulated signal is received over a channel, the signal comprising a sequence of symbols, each of the symbols comprising one or more pilot carriers and one or more data carriers. At operation 620, the frequency response of the channel is estimated based on time filtering and interpolation of the pilot carriers, after the symbols are converted to the frequency domain using an FFT. At operation 630, each of a plurality of phase slope corrections is applied to the frequency response. At operation 640, frequency response estimates of the channel, corresponding to the data carrier frequencies, are calculated based on frequency filtering and interpolation of the phase slope corrected frequency response. At operation 650, each of the plurality of phase slope corrections is applied to the data carriers. At operation 660, the phase slope corrected data carriers are equalized based on the calculated frequency response estimates. At operation 670, the mean square error between the equalized data carriers and a nearest QAM constellation point is computed. At operation 680, the phase slope correction associated with the minimum of the mean square errors is selected, wherein the selected phase slope resolves the cyclic ambiguity.

Figure 7:
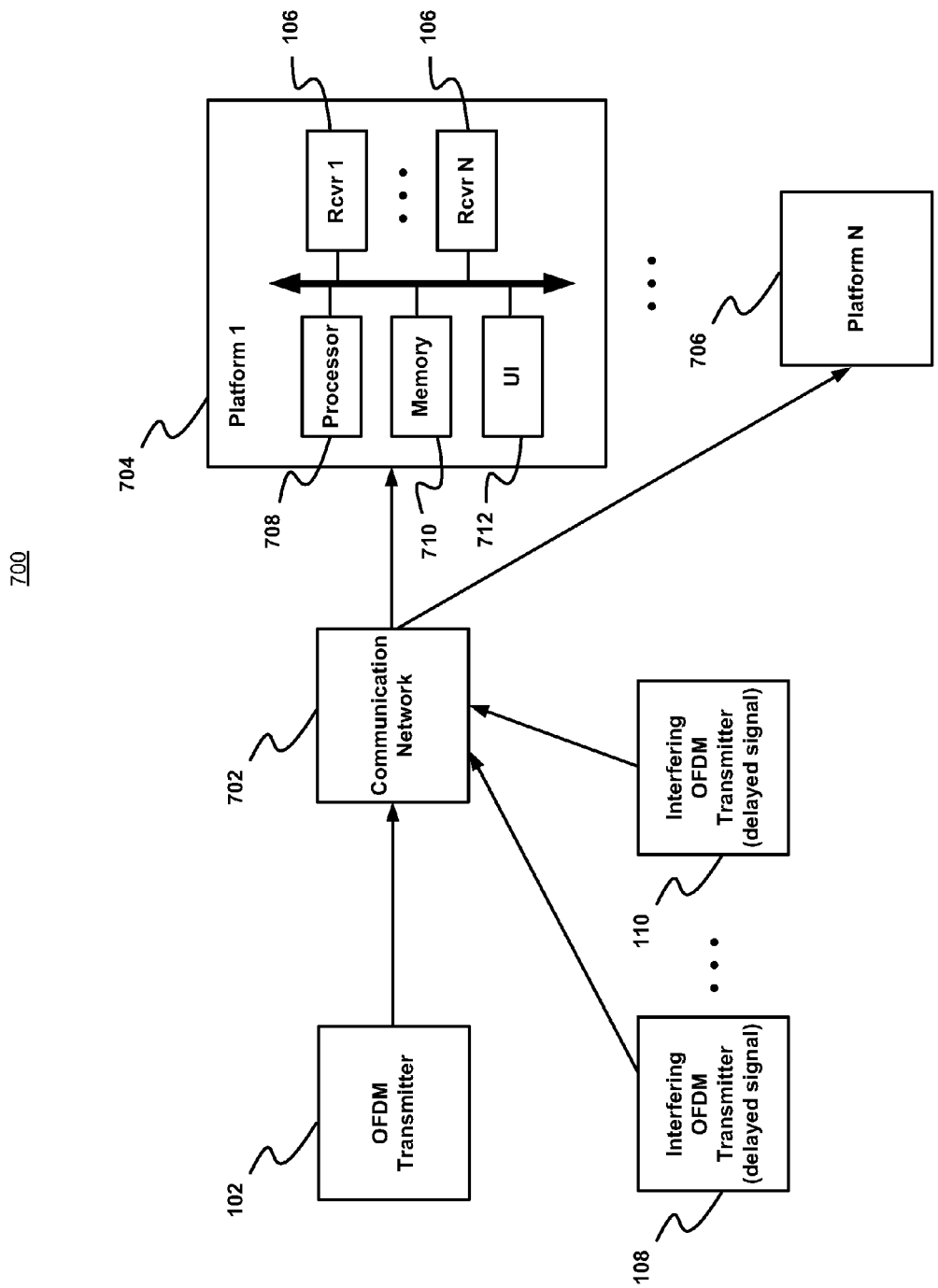
FIG. 7 illustrates a system diagram showing platforms consistent with an exemplary embodiment of the present disclosure in a communications network.

FIG. 7 illustrates a system diagram 700 showing platforms consistent with an exemplary embodiment of the present disclosure in a communications network. A platform 704, 706 may be a device, such as, for example, a smartphone, a tablet, a digital television, a laptop computing device or any other device configured to receive an OFDM modulated signal. Platforms 704, 706 may comprise a processor 708, memory 710, a user interface 712 and one or more OFDM receivers 106 configured to resolve cyclic ambiguity. In some embodiments, the user interface may be a touchscreen. Any number of platforms 704, 706 may receive OFDM signals transmitted over a communication network 702 from transmitters 102, 108, 110. In some embodiments, communication network 702 may be a Wireless Metropolitan Area Network (WMAN), a Wireless Metropolitan Area Network (WMAN), or a digital television network.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A system for resolving cyclic ambiguity in an orthogonal frequency division multiplexed (OFDM) modulated received signal, said system comprising:
  a demodulator configured to receive an OFDM modulated signal over a channel, said signal comprising a sequence of symbols, each of said symbols comprising one or more pilot carriers and one or more data carriers;

a time filtering and interpolation circuit coupled to said demodulator, said time filtering and interpolation circuit configured to estimate the frequency response of said channel based on time filtering and interpolation of said pilot carriers;

a phase slope correction circuit configured to apply each of a plurality of phase slope corrections to said frequency response and to said data carriers;

a frequency filtering and interpolation circuit configured to calculate frequency response estimates of said channel at data carrier frequencies based on frequency filtering and interpolation of said phase slope corrected frequency response;

an equalization circuit configured to equalize said phase slope corrected data carriers based on said calculated frequency response estimates;

an error calculation circuit configure to calculate the mean square error between said equalized data carriers and a nearest QAM constellation point; and an iterative phase slope optimization circuit configured to select the phase slope correction associated with the minimum of said mean square errors, wherein said selected phase slope resolves said cyclic ambiguity.

2. The system of claim 1, further comprising an inverse Fast Fourier Transform (FFT) circuit configured to calculate a channel impulse response based on said calculated frequency response estimates, wherein said channel impulse response has resolved cyclic ambiguity.

3. The system of claim 2, further comprising an inter-symbol interference reduction circuit configured to refine symbol timing based on said channel impulse response.

4. The system of claim 1, wherein said channel is a single frequency network.

5. The system of claim 1, wherein said plurality of phase slope corrections correspond to a range of cyclic ambiguity.

6. The system of claim 1, wherein said phase slope optimization circuit is further configured to operate on a subset of said symbols, wherein said subset is based on a relative rate of motion between a receiver and one or more transmitters of said OFDM modulated signal.

7. The system of claim 1, wherein said phase slope optimization circuit is further configured to operate during an initial signal acquisition period.

8. A method for resolving cyclic ambiguity in an OFDM modulated received signal, said method comprising:

receiving an OFDM modulated signal over a channel, said signal comprising a sequence of symbols, each of said symbols comprising one or more pilot carriers and one or more data carriers;

estimating the frequency response of said channel based on time filtering and interpolation of said pilot carriers;

applying each of a plurality of phase slope corrections to said frequency response;

calculating frequency response estimates of said channel at data carrier frequencies, said calculating based on frequency filtering and interpolation of said phase slope corrected frequency response;

applying each of said plurality of phase slope corrections to said data carriers;

equalizing said phase slope corrected data carriers based on said calculated frequency response estimates;

computing the mean square error between said equalized data carriers and a nearest QAM constellation point; and selecting the phase slope correction associated with the minimum of said mean square errors, wherein said selected phase slope resolves said cyclic ambiguity.

9. The method of claim 8, further comprising calculating a channel impulse response based on said calculated frequency response estimates using an inverse FFT, wherein said channel impulse response has resolved cyclic ambiguity.

10. The method of claim 9, further comprising refining symbol timing using inter-symbol interference reduction based on said channel impulse response.

11. The method of claim 8, wherein said channel is a single frequency network.

12. The method of claim 8, further comprising selecting said plurality of phase slope corrections to correspond to a range of cyclic ambiguity.

13. The method of claim 8, further comprising operating on a subset of said symbols, wherein said subset is based on a relative rate of motion between a receiver and one or more transmitters of said OFDM modulated signal.

14. The method of claim 8, further comprising operating during an initial signal acquisition period.

15. A non-transitory computer-readable storage medium having instructions stored thereon which when executed by a processor result in the following operations for resolving cyclic ambiguity in an OFDM modulated received signal, said operations comprising:

receiving an OFDM modulated signal over a channel, said signal comprising a sequence of symbols, each of said symbols comprising one or more pilot carriers and one or more data carriers;

estimating the frequency response of said channel based on time filtering and interpolation of said pilot carriers;

applying each of a plurality of phase slope corrections to said frequency response;

calculating frequency response estimates of said channel at data carrier frequencies, said calculating based on frequency filtering and interpolation of said phase slope corrected frequency response;

applying each of said plurality of phase slope corrections to said data carriers;

equalizing said phase slope corrected data carriers based on said calculated frequency response estimates;

computing the mean square error between said equalized data carriers and a nearest QAM constellation point; and selecting the phase slope correction associated with the minimum of said mean square errors, wherein said selected phase slope resolves said cyclic ambiguity.

16. The non-transitory computer-readable storage medium of claim 15, wherein said operations further comprise calculating a channel impulse response based on said calculated frequency response estimates using an inverse FFT, wherein said channel impulse response has resolved cyclic ambiguity.

17. The non-transitory computer-readable storage medium of claim 16, wherein said operations further comprise refining symbol timing using inter-symbol interference reduction based on said channel impulse response.

18. The non-transitory computer-readable storage medium of claim 15, wherein said operations further comprise selecting said plurality of phase slope corrections to correspond to a range of cyclic ambiguity.

19. The non-transitory computer-readable storage medium of claim 15, wherein said operations further comprise operating on a subset of said symbols, wherein said subset is based on a relative rate of motion between a receiver and one or more transmitters of said OFDM modulated signal.

20. The non-transitory computer-readable storage medium of claim 15, wherein said operations further comprise operating during an initial signal acquisition period.

21. A system for resolving cyclic ambiguity in a communication network using OFDM modulated signals, said system comprising:
- a platform including a processor, memory coupled to said processor and a user interface coupled to said processor;
- one or more demodulators coupled to said processor, said demodulators configured to receive said OFDM modulated signals over a channel, said signals comprising a sequence of symbols, each of said symbols comprising one or more pilot carriers and one or more data carriers;
- a time filtering and interpolation circuit coupled to said demodulator, said time filtering and interpolation circuit configured to estimate the frequency response of said channel based on time filtering and interpolation of said pilot carriers;
- a phase slope correction circuit configured to apply each of a plurality of phase slope corrections to said frequency response and to said data carriers;
- a frequency filtering and interpolation circuit configured to calculate frequency response estimates of said channel at data carrier frequencies based on frequency filtering and interpolation of said phase slope corrected frequency response;
- an equalization circuit configured to equalize said phase slope corrected data carriers based on said calculated frequency response estimates;
- an error calculation circuit configure to calculate the mean square error between said equalized data carriers and a nearest QAM constellation point; and
- an iterative phase slope optimization circuit configured to select the phase slope correction associated with the minimum of said mean square errors, wherein said selected phase slope resolves said cyclic ambiguity.

22. The system of claim 21, further comprising an inverse Fast Fourier Transform (FFT) circuit configured to calculate a channel impulse response based on said calculated frequency response estimates, wherein said channel impulse response has resolved cyclic ambiguity.

23. The system of claim 22, further comprising an inter-symbol interference reduction circuit configured to refine symbol timing based on said channel impulse response.

24. The system of claim 21, wherein said communication network is a single frequency network.

25. The system of claim 21, wherein said plurality of phase slope corrections correspond to a range of cyclic ambiguity.

26. The system of claim 21, wherein said phase slope optimization circuit is further configured to operate on a subset of said symbols, wherein said subset is based on a relative rate of motion between a receiver and one or more transmitters of said OFDM modulated signal.

27. The system of claim 21, wherein said phase slope optimization circuit is further configured to operate during an initial signal acquisition period.

28. The system of claim 21 wherein said platform is one of a smartphone, a tablet, a digital television or a laptop computing device.

29. The system of claim 21 wherein said user interface is a touchscreen.

30. The system of claim 21 further comprising a plurality of said platforms each configured to communicate over a communication network.

31. The system of claim 21 wherein said communication network is a Wireless Wide Area Network (WWAN).

32. The system of claim 21 wherein said communication network is a Wireless Metropolitan Area Network (WMAN).

33. The system of claim 21 wherein said communication network is a digital television network.

* * * * *